(12) United States Patent
Ono

(10) Patent No.: US 9,164,747 B2
(45) Date of Patent: Oct. 20, 2015

(54) INFORMATION PROCESSING SYSTEM, DEVICE, AND INFORMATION PROCESSING METHOD

(71) Applicant: Zentaroh Ono, Tokyo (JP)

(72) Inventor: Zentaroh Ono, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/023,643

(22) Filed: Sep. 11, 2013

(65) Prior Publication Data

US 2014/0082609 A1   Mar. 20, 2014

(30) Foreign Application Priority Data

Sep. 18, 2012   (JP) ................................ 2012-204252

(51) Int. Cl.
*G06F 9/44* (2006.01)
*G06F 9/445* (2006.01)

(52) U.S. Cl.
CPC .. *G06F 8/61* (2013.01); *G06F 8/60* (2013.01); *G06F 8/65* (2013.01); *G06F 8/67* (2013.01)

(58) Field of Classification Search
CPC ............... G06F 8/60; G06F 8/61; G06F 8/65; G06F 8/67
See application file for complete search history.

(56) References Cited

U.S. PATENT DOCUMENTS

| | | | | |
|---|---|---|---|---|
| 7,574,706 | B2 * | 8/2009 | Meulemans et al. | 717/174 |
| 7,818,467 | B2 * | 10/2010 | Anwer | 710/10 |
| 8,346,223 | B1 * | 1/2013 | Byrnes et al. | 717/174 |
| 8,554,957 | B1 * | 10/2013 | Wieland | 710/8 |
| 8,667,599 | B2 * | 3/2014 | Tsuboi | 726/26 |
| 2002/0161990 | A1 * | 10/2002 | Zhang et al. | 713/1 |
| 2004/0073276 | A1 * | 4/2004 | Samuelsson | 607/60 |
| 2008/0005029 | A1 * | 1/2008 | Ando | 705/51 |
| 2008/0040495 | A1 * | 2/2008 | Adams et al. | 709/230 |
| 2008/0133650 | A1 * | 6/2008 | Saarimaki et al. | 709/203 |
| 2009/0150865 | A1 * | 6/2009 | Young et al. | 717/120 |
| 2009/0237715 | A1 * | 9/2009 | Kasatani | 358/1.15 |
| 2010/0083006 | A1 * | 4/2010 | So et al. | 713/193 |

(Continued)

FOREIGN PATENT DOCUMENTS

JP   2006-079211   3/2006
JP   2008-243179   10/2008

OTHER PUBLICATIONS

Dave Bishop, "Step-By-Step Guide to Controlling Device Installation Using Group Policy", Microsoft, Jun. 2007, pp. 1-17; <https://msdn.microsoft.com/en-us/library/bb530324(d=printer).aspx>.*

(Continued)

*Primary Examiner* — Thuy Dao
*Assistant Examiner* — Ben C Wang
(74) *Attorney, Agent, or Firm* — IPUSA, PLLC

(57) ABSTRACT

A system, where a device and at least one information processing apparatus are connected via a network to each other, includes a configuration unit that, when receiving a request to use a service together with a device identifier of the device, stores configuration information in a relationship information storage, wherein the configuration information associates the device identifier with at least one program identifier that is stored in a service information storage in association with the service; and a transmitting unit that sends an installation request to install a program corresponding to the program identifier to the device corresponding to the device identifier that is associated by the configuration information with the program identifier.

9 Claims, 13 Drawing Sheets

(56) References Cited

U.S. PATENT DOCUMENTS

| | | | |
|---|---|---|---|
| 2010/0211945 A1* | 8/2010 | Doui | 717/176 |
| 2010/0333081 A1* | 12/2010 | Etchegoyen | 717/172 |
| 2010/0333207 A1* | 12/2010 | Etchegoyen | 726/26 |
| 2011/0040857 A1* | 2/2011 | Collins et al. | 709/222 |
| 2012/0011241 A1* | 1/2012 | Etchegoyen | 709/223 |
| 2012/0059916 A1* | 3/2012 | Ohashi | 709/222 |
| 2013/0152220 A1* | 6/2013 | Zhang et al. | 726/30 |
| 2013/0326502 A1* | 12/2013 | Brunsman et al. | 717/178 |
| 2014/0189119 A1* | 7/2014 | Stuntebeck | 709/225 |
| 2015/0074659 A1* | 3/2015 | Madsen et al. | 717/177 |

OTHER PUBLICATIONS

Yang et al., "uPnP: Plug and Play Peripherals for the Internet of Things", 2015 ACM, EuroSys'15, Apr. 21-24, 2015, Bordeaux, France, pp. 1-14; <http://dl.acm.org/citation.cfm?id=2741948.2741980&coll=DL&dl=GUIDE&CFID=525099322&CFTOKEN=43339598>.*

Becker et al., "Automatically Determining Compatibility of Evolving Services", 2008 IEEE, ICWS '08, Sep. 2008, pp. 161-168; <http://ieeexplore.ieee.org/stamp/stamp.jsp?tp=&arnumber=4670172>.*

* cited by examiner

FIG.6

| SERVICE NAME | DESCRIPTION | DETAILED DESCRIPTION | USED PLUG-IN NAME | ... |
|---|---|---|---|---|
| AAA | ... | ... | ... | ... |
| BBB | ... | ... | ... | ... |
| .. | .. | .. | .. | .. |

| SERVICE NAME | OWNER | LICENSE COUNT | USAGE COUNT | EXPIRATION DATE | ... |
|---|---|---|---|---|---|
| AAA | ... | 10 | 7 | ... | ... |
| .. | ... | .. | ... | ... | .. |

| DEVICE NUMBER | OWNER | INSTALLATION LOCATION | 233 |
|---|---|---|---|
| 111111111 | ... | MEETING ROOM B, 1ST FLOOR, BUILDING A | ... |
| 222222222 | ... | ROOM 1, 2ND FLOOR, BUILDING A | ... |
| 333333333 | ... | MEETING ROOM A, 3RD FLOOR, BUILDING C | ... |
| ... | ... | ... | ... |

FIG.11

LINKED-DEVICE SELECTION — 530

| | DEVICE NUMBER | INSTALLATION LOCATION |
|---|---|---|
| ☑ | 1111111111 | MEETING ROOM B, 1ST FLOOR, BUILDING A |
| ☑ | 2222222222 | ROOM 1, 2ND FLOOR, BUILDING A |
| ☐ | 3333333333 | MEETING ROOM A, 3RD FLOOR, BUILDING C |
| | ... | |

OK — 531     CANCEL

FIG.12

| SERVICE NAME | DEVICE NUMBER | STATUS | |
|---|---|---|---|
| BBB | 111111111 | NOT INSTALLED | ... |
| | 222222222 | NOT INSTALLED | ... |
| ... | ... | ... | ... |

236

INFORMATION PROCESSING SYSTEM, DEVICE, AND INFORMATION PROCESSING METHOD

CROSS-REFERENCE TO RELATED APPLICATION

The present application is based upon and claims the benefit of priority of Japanese Patent Application No. 2012-204252, filed on Sep. 18, 2012, the entire contents of which are incorporated herein by reference.

BACKGROUND OF THE INVENTION

1. Field of the Invention

An aspect of this disclosure relates to an information processing system, a device, and an information processing method.

2. Description of the Related Art

There exist image forming devices to which functions can be added by installing application programs (see, for example, Japanese Laid-Open Patent Publication No. 2006-079211).

Meanwhile, cloud services have been getting attention in recent years. It is possible to provide added value to users of image forming devices by linking the image forming devices with services provided via a network, such as cloud services, Web services, and application service provider (ASP) services.

Here, to link an image forming device with services provided via a network, it may be necessary to install one or more programs in the image forming device.

However, it is bothersome for a user to determine what programs need to be installed in an image forming device to use certain services, and to manually install the programs.

Such a problem applies not only to image forming devices but also to other electronic devices and general-purpose computers.

SUMMARY OF THE INVENTION

In an aspect of this disclosure, there is provided a system where a device and at least one information processing apparatus are connected via a network to each other. The system includes a configuration unit that, when receiving a request to use a service together with a device identifier of the device, stores configuration information in a relationship information storage, wherein the configuration information associates the device identifier with at least one program identifier that is stored in a service information storage in association with the service; and a transmitting unit that sends an installation request to install a program corresponding to the program identifier to the device corresponding to the device identifier that is associated by the configuration information with the program identifier.

BRIEF DESCRIPTION OF THE DRAWINGS

FIG. 6 is a table illustrating an exemplary data structure of a service information storage;

FIG. 7 is a table illustrating an exemplary data structure of a license information storage;

FIG. 10 is a table illustrating an exemplary data structure of a device information storage;

FIG. 11 is a drawing illustrating an exemplary linked device selection screen;

FIG. 12 is a table illustrating an exemplary data structure of an installation status storage.

DESCRIPTION OF THE PREFERRED EMBODIMENTS

Figure 1:
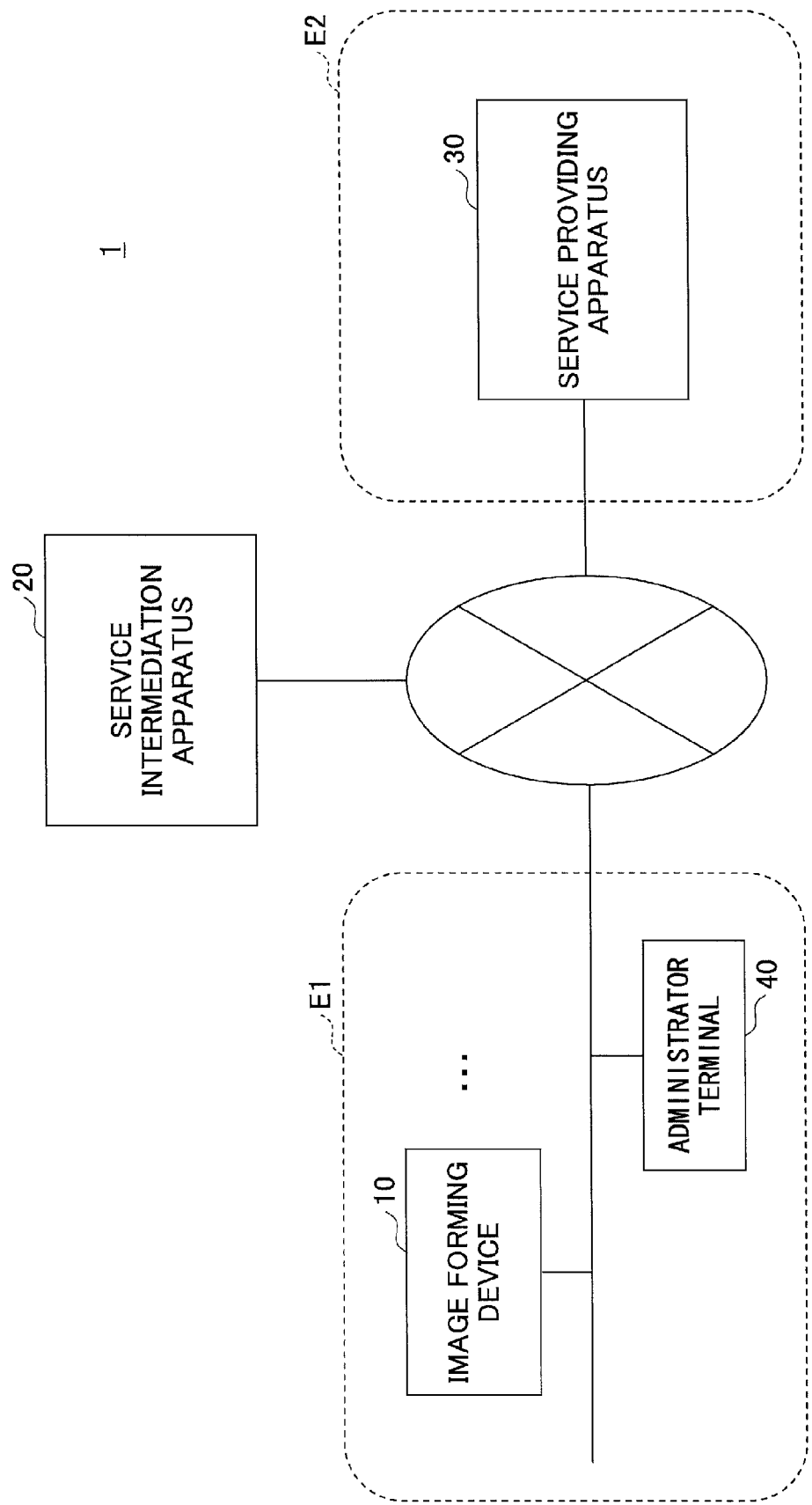
FIG. 1 is a drawing illustrating an exemplary configuration of an information processing system according to an embodiment.

Preferred embodiments of the present invention are described below with reference to the accompanying drawings. FIG. 1 is a drawing illustrating an exemplary configuration of an information processing system 1 according to an embodiment. In the information processing system 1 of FIG. 1, a service intermediation apparatus 20 is connected via a communication network such as a local area network (LAN), an intranet, or the Internet, to a user environment E1 and a service providing environment E2.

The service intermediation apparatus 20 is a computer that intermediates between the user environment E1 and the service providing environment E2. Hereafter, a function or a service provided by the service intermediation apparatus 20 is referred to as an "intermediary service". For example, the service intermediation apparatus 20 provides the intermediary service as a cloud service on the Internet. Alternatively, the service intermediation apparatus 20 may be provided as a private cloud in a company where the user environment E1 exists.

The service providing environment E2 is a system environment located in an organization that provides services via the network. The service providing environment E2 includes a service providing apparatus 30. The service providing apparatus 30 provides, via the network, "device-linked services" that are linked with an image forming device 10 of the user environment E1 in a form of, for example, cloud services, Web services, or application service provider (ASP) services. The device-linked services may be simply referred to as "services" for brevity. In the device-linked services, for example, information provided by the image forming device 10 is used. Examples of information provided by the image forming device 10 include configuration information and status information of the image forming device 10 and image data obtained by the image forming device 10 by scanning a document.

The user environment E1 is a system environment in a company where the image forming device 10 is used. In the user environment E1, one or more image forming devices 10 and an administrator terminal 40 are connected to each other via a network such as a local area network (LAN).

The image forming device 10 is an example of a device according to the present embodiment, and the present invention may be applied to any other type of device. In the present embodiment, it is assumed that the image forming device 10 is a multifunction peripheral including two or more of functions such as printing, scanning, copying, and facsimile transmission and reception. Also, a device including one of the above functions may be used as the image forming device 10.

The administrator terminal 40 is used by an administrator of the image forming device 10 in the user environment E1. For example, the administrator terminal 40 may be implemented by a personal computer (PC), a personal digital assistant (PDA), a tablet terminal, a smartphone, or a cell phone.

Figure 2:
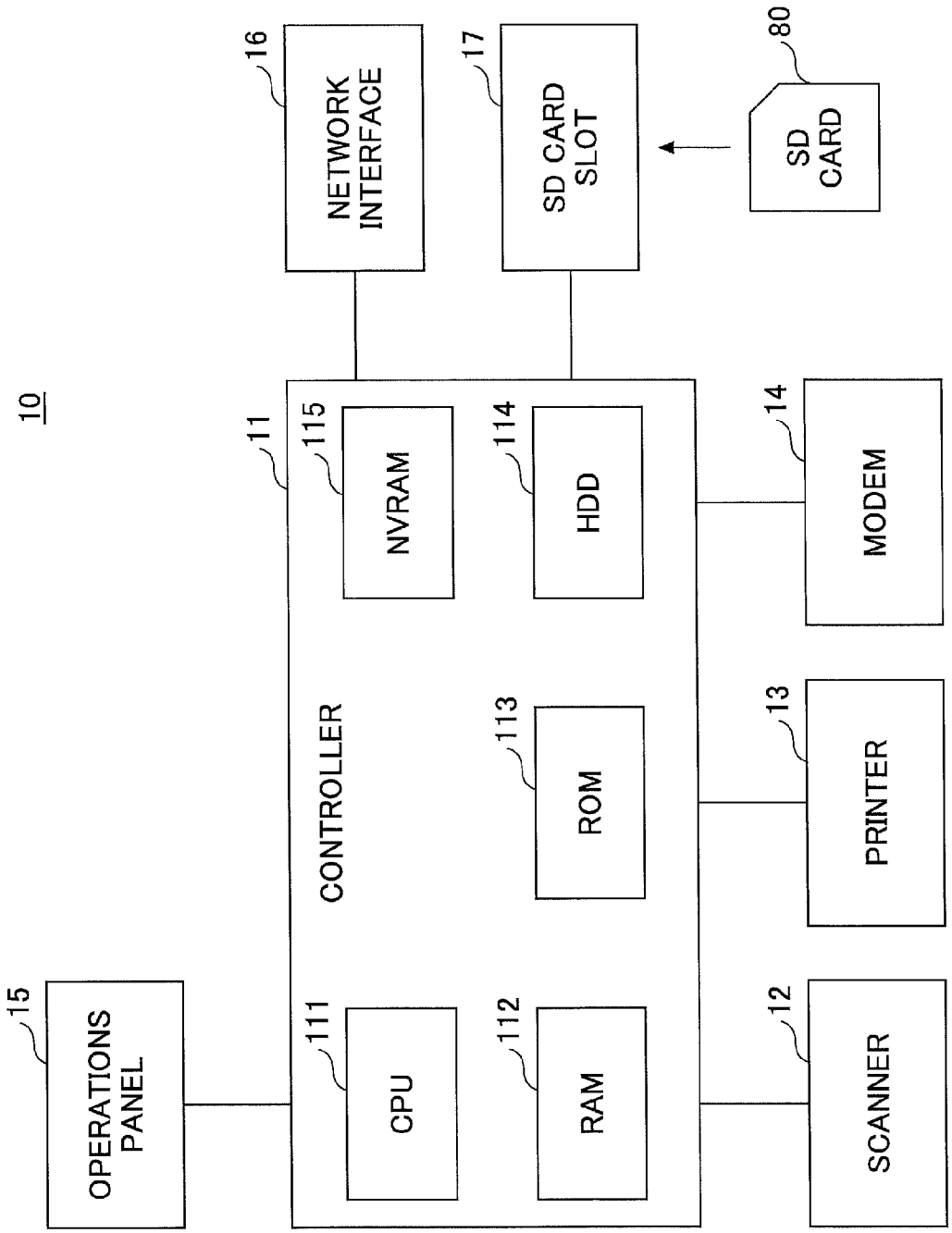
FIG. 2 is a block diagram illustrating an exemplary hardware configuration of an image forming device according to an embodiment.

FIG. 2 is a block diagram illustrating an exemplary hardware configuration of the image forming device 10. As illustrated by FIG. 2, the image forming device 10 may include, as hardware components, a controller 11, a scanner 12, a printer 13, a modem 14, an operations panel 15, a network interface 16, and a secure digital (SD) card slot 17.

The controller 11 may include a central processing unit (CPU) 111, a random access memory (RAM) 112, a read-only memory (ROM) 113, a hard disk drive (HDD) 114, and a non-volatile RAM (NVRAM) 115. The ROM 113 stores, for example, programs and data used by the programs. The RAM 112 is used, for example, as a storage area into which programs are loaded and as a work area for the loaded programs. The CPU 111 executes the programs loaded into the RAM 112 to implement various functions. The HDD 114 stores, for example, programs and data used by the programs. The NVRAM 115 stores, for example, various settings.

The scanner 12 is a hardware component (image scanning unit) for scanning a document to obtain image data. The printer 13 is a hardware component (printing unit) for printing print data on a recording medium such as paper. The modem 14 is a hardware component for connecting the image forming device 10 to a telephone line and is used to send and receive image data in facsimile communications. The operations panel 15 is a hardware component including an input unit such as buttons for receiving user inputs and a display unit such as a liquid crystal display panel. The network interface is a hardware component for connecting the image forming device 10 to a (wired or wireless) network such as a local area network (LAN). The SD card slot 17 reads, for example, programs stored in a secure digital (SD) card 80. With the image forming device 10 configured as described above, in addition to the programs stored in the ROM 113 and the HDD 114, programs stored in the SD card 80 can be loaded into the RAM 112 and executed. Instead of the SD card 80, any other storage medium (e.g., a CD-ROM or a universal serial bus (USB) memory) may be used for this purpose. That is, a storage medium that can be mounted on the image forming device 10 is not limited to the SD card 80. When a storage medium other than the SD card 80 is used, the SD card slot 17 may be replaced with a hardware component corresponding to the storage medium used.

Figure 3:
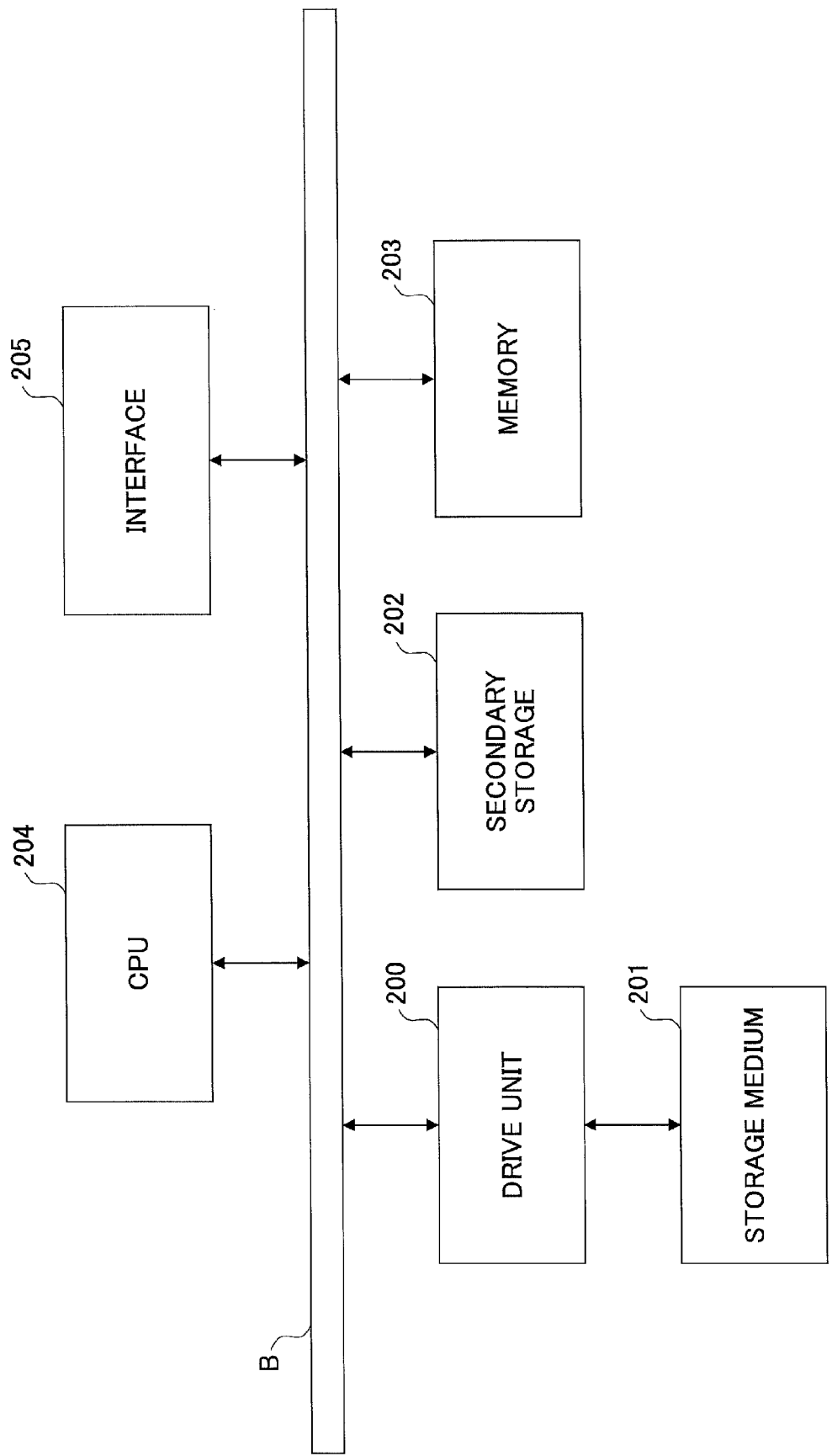
FIG. 3 is a block diagram illustrating an exemplary hardware configuration of a service intermediation apparatus according to an embodiment.

FIG. 3 is a block diagram illustrating an exemplary hardware configuration of the service intermediation apparatus 20 of the present embodiment. As illustrated by FIG. 3, the service intermediation apparatus 20 may include a drive unit 200, a secondary storage 202, a memory 203, a CPU 204, and an interface 205 that are connected to each other via a bus B.

Programs for performing various processes at the service intermediation apparatus 20 may be provided via a storage medium 201 such as a CD-ROM, a DVD-ROM, or a USB memory. When the storage medium 201 storing programs is mounted on the drive unit 200, the programs are read by the drive unit 200 from the storage medium 201 and are installed in the secondary storage 202. Programs may not necessarily be installed from the storage medium 201. For example, programs may be downloaded via a network from another computer. The secondary storage unit 202 stores the installed programs and other necessary files and data.

The memory 203 temporarily stores programs read from the secondary storage 202 when the programs are executed. The CPU 204 performs functions of the service intermediation apparatus 20 according to the programs temporarily stored in the memory 203. The interface 205 connects the service intermediation apparatus 20 to a network.

The service providing apparatus 30 may also have a hardware configuration as illustrated by FIG. 3.

Figure 4:
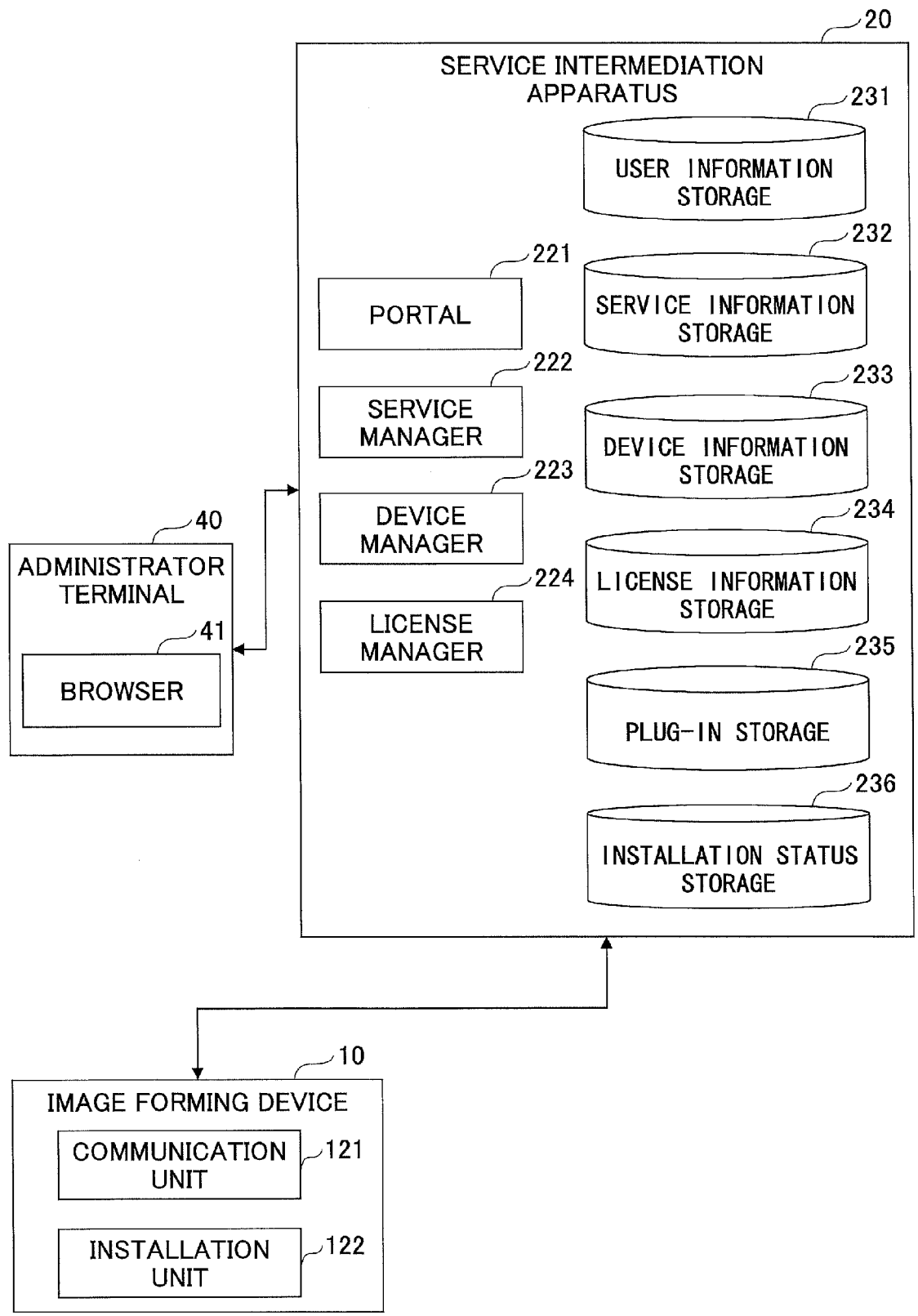
FIG. 4 is a block diagram illustrating an exemplary functional configuration of an information processing system according to an embodiment.

FIG. 4 is a drawing illustrating an exemplary functional configuration of the information processing system 1 according to the present embodiment. As illustrated by FIG. 4, the image forming device 10 may include a communication unit 121 and an installation unit 122. These functional units may be implemented by executing programs installed in the image forming device 10 by the CPU 111.

The communication unit 121 communicates with the service intermediation apparatus 20. The installation unit 122 installs programs in the image forming device 10. In the present embodiment, the installation unit 122 installs programs necessary for linkage with device-linked services selected as linkage targets. Hereafter, programs necessary for linkage with device-linked services are referred to as "plug-ins".

The service intermediation apparatus 20 may include a portal 221, a service manager 222, a device manager 223, and a license manager 224. These functional units may be implemented by executing programs installed in the service intermediation apparatus 20 by the CPU 204. The service intermediation apparatus 20 may also include a user information storage 231, a service information storage 232, a device information storage 233, a license information storage 234, a plug-in storage 235, and an installation status storage 236. These storages may be implemented, for example, by the secondary storage 202 and/or a storage device connected via a network to the service intermediation apparatus 20.

The user information storage 231 stores user information of registered users of the intermediary service. The service information storage 232 stores information on device-linked services. The device information storage 233 stores attribute information (device information) of the image forming devices 10 in the user environment E1. The license information storage 234 stores information on licenses (or use rights) for device-linked services. The plug-in storage 235 stores entities of plug-ins. The installation status storage 236 stores the installation status of plug-ins necessary for linkage with device-linked services, for each image forming device 10 to be linked with the device-linked services.

The portal 221 functions as a portal for the intermediary service. In the present embodiment, the administrator terminal 40 receives the intermediary service via the portal 221. The service manager 222 controls, for example, a configuration process performed when use of a device-linked service is started and a process of installing a plug-in into the image forming device 10 to be linked with the device-linked service. The device manager 223 accesses device information stored in the device information storage 233. The license manager 224 manages licenses of device-linked services.

The administrator terminal 40 includes a browser 41. The browser 41 may be implemented by executing a program such as a general Web browser program by a CPU of the administrator terminal 40. Accordingly, the browser 41 provides functions similar to those of a general Web browser.

An exemplary process performed in the information processing system 1 is described below. In the user environment E1 where the use of a device-linked service is desired, the administrator operates the administrator terminal 40 to perform a preparation process or a configuration process to use the device-linked service.

Figure 5A:
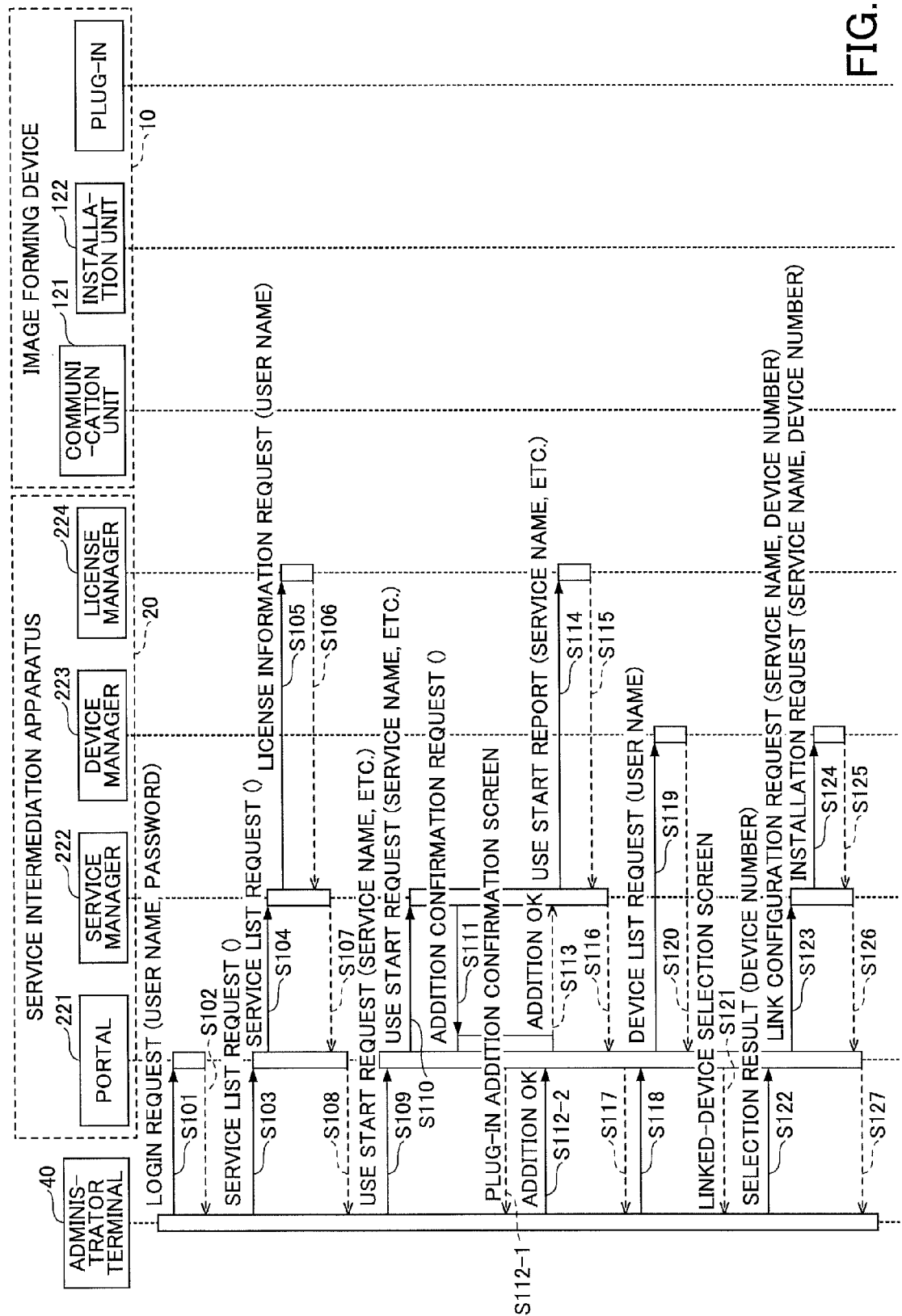
FIGS. 5A and 5B are sequence charts illustrating an exemplary preparation process for using a service.
Figure 5B:
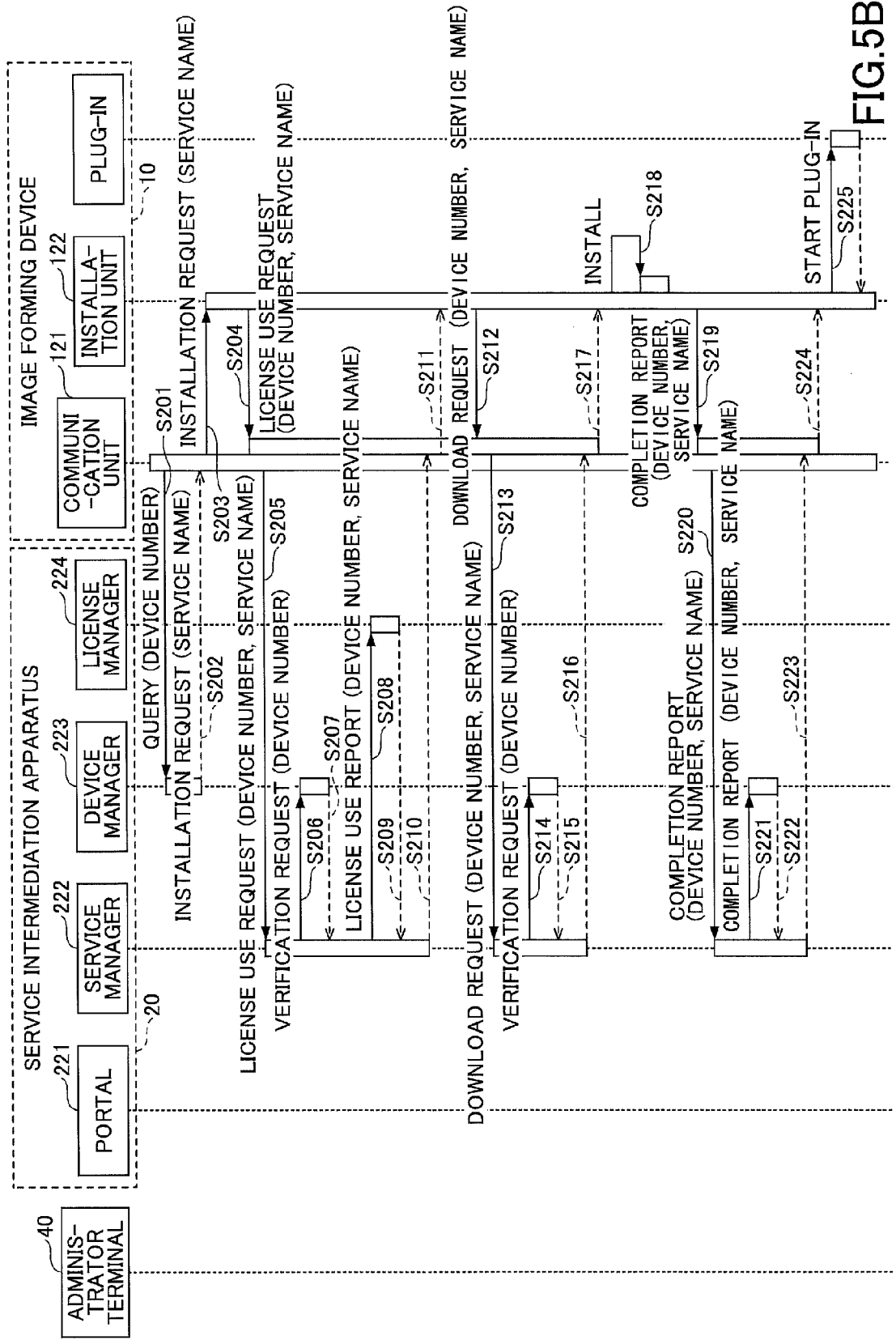

FIGS. 5A and 5B are sequence charts illustrating an exemplary preparation process for using a service.

For example, when the administrator enters login information such as a user name and a password on a login screen for the intermediary service displayed by the browser 41 of the administrator terminal 40, the browser 41 sends a login request (or an authentication request) including the login information to the portal 221 of the service intermediation apparatus 20 (S101). The portal 221 performs authentication by referring to the user information storage 231 based on the user name and the password in the login request. More specifically, the portal 221 performs authentication by comparing the user name and the password in the login request with user names and passwords stored in the user information storage 231.

When a user name and a password that match the user name and the password in the login request are stored in the user information storage 231, the portal 221 determines that the authentication is successful. When the authentication is successful, a session management is performed for communications between the browser 41 and the portal 221, for example, according to a known technology. Accordingly, based on a session management mechanism, the portal 221 can identify the user name (which is hereafter referred to as a "login user name") of the administrator, who is using the browser 41, for subsequent requests from the browser 41.

When the authentication is successful, the portal 221 sends a response including, for example, hypertext markup language (HTML) data for displaying a portal screen to the browser 41 of the administrator terminal 40 (S102). When receiving the response, the browser 41 displays the portal screen on a display unit of the administrator terminal 40 based on the HTML data in the response.

When an instruction to display a service list is entered on the portal screen by the administrator, the browser 41 sends a request for the service list to the portal 221 (S103). In response, the portal 221 requests the service manager 222 to obtain the service list (S104). Then, the service manager 222 obtains list information of registered device-linked services from the service information storage 232.

FIG. 6 is a table illustrating an exemplary data structure of the user information storage 232. As illustrated by FIG. 6, the service information storage 232 stores a record including a service name (field), a description (field), a detailed description (field), and a used plug-in name (field) for each device-linked service.

The service name is an example of identification information (or identifier) of the corresponding device-linked service. The description is a character string describing the content of the device-linked service. The detailed description is a character string describing the content of the device-linked service in detail. The used plug-in name (which may be simply referred to as a "plug-in name") is identification information (or identifier) of a plug-in that needs to be installed in the image forming device 10 to be linked with the device-linked service. When multiple plug-ins need to be installed, multiple plug-in names are stored in the used plug-in name field.

Next, the service manager 222 requests the license manager 224 to obtain license information for device-linked services based on the login user name (S105). The license manager 224 obtains license information from records that are stored in the license information storage 234 in association with the login user name, and sends a response including the obtained license information to the service manager 222 (S106).

FIG. 7 is a table illustrating an exemplary data structure of the license information storage 234. As illustrated by FIG. 7, each record (license information) of the license information storage 234 includes a service name (field), an owner (field), a license count (field), a usage count (field), and an expiration date (field).

The service name is identification information (or identifier) of a licensed device-linked service. The owner is identification information (or identifier) of a license owner (or acquirer). In the present embodiment, the user name of an administrator is used as the identification information of the license owner. However, any attribute information or identification information of a license owner other than the user name of an administrator may also be used as a value of the owner field. The license count is the number of licenses of the device-linked service corresponding to the service name that are assigned to the administrator indicated by the owner. The usage count is the number of licenses being actually used. The expiration date indicates the date until which the licenses are valid. The license count, the usage count, and the expiration date are examples of license information indicating the status of licenses.

Thus, at step S106, license information obtained from records whose owner field includes a user name corresponding to the login user name is sent to the service manager 222.

Next, the service manager 222 attaches flags to the device-linked services in the list information obtained from the service information storage 232 to distinguish services that have already begun to be used from services that have not begun to be used, and sends a response including the list information with the flags to the portal 221 (S107). More specifically, the service manger 222 attaches a flag indicating that the use has already been started to services corresponding to the service names included in the license information received at step S106. On the other hand, the service manger 222 attaches a flag indicating that the use has not been started to services that do not correspond to the service names included in the license information.

Based on the list information with the flags included in the response, the portal 221 generates HTML data for displaying a service list screen. Then, the portal 221 sends a response including the HTML data to the browser 41 (S108).

When receiving the response, the browser 41 displays the service list screen on the display unit of the administrator terminal 40 based on the HTML data in the response.

Figure 8:
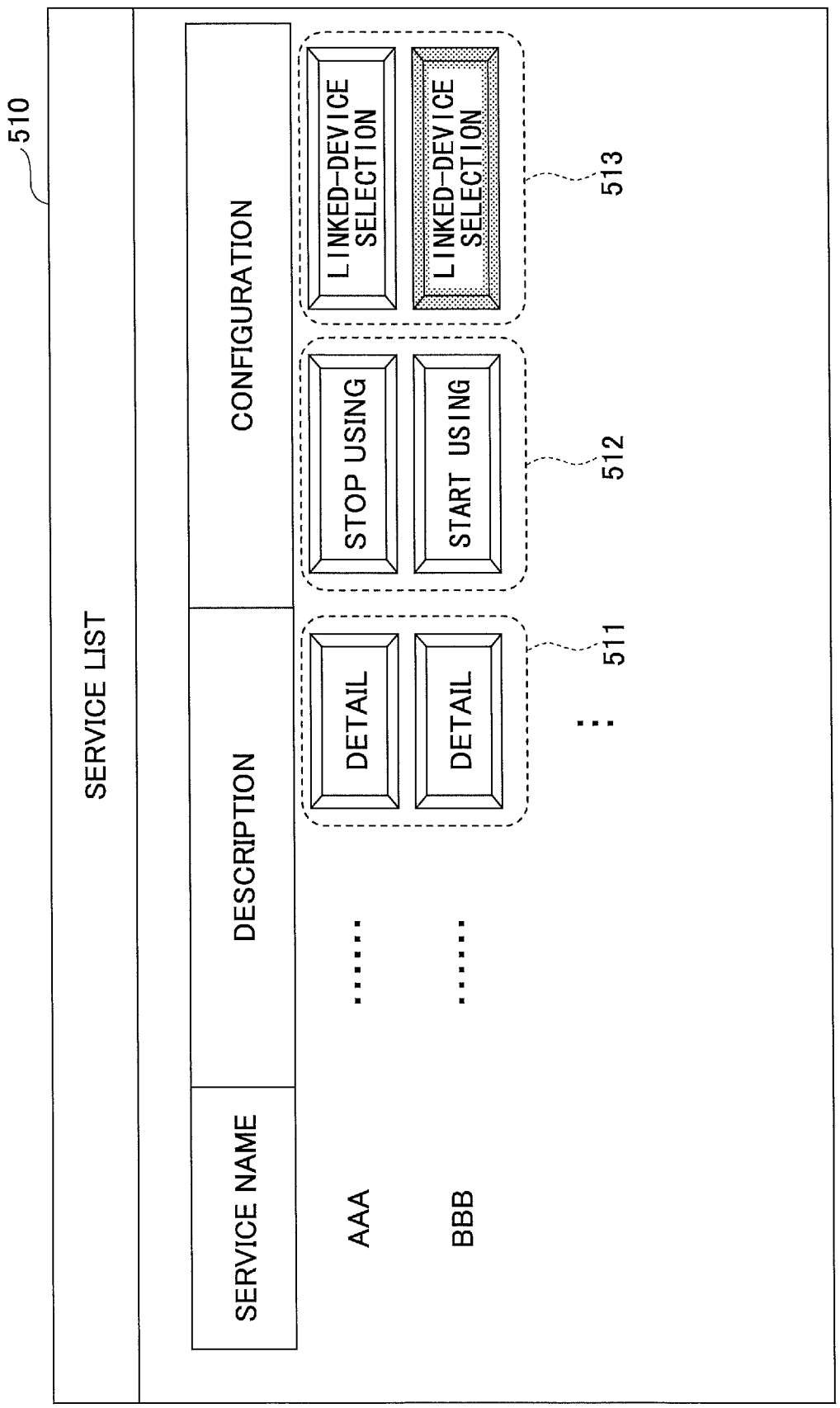
FIG. 8 is a drawing illustrating an exemplary service list screen.

FIG. 8 is a drawing illustrating an exemplary service list screen 510. As illustrated by FIG. 8, the service list screen 510 displays information items such as a service name and a description for each of the device-linked services stored in the service information storage 232. When a detail button 511 in the description field is pressed, detailed information of the corresponding device-linked service obtained from the service information storage 232 is displayed.

The service list screen 510 also includes a configuration button 512 and a linked device selection button 513 for each device-linked service. The configuration button 512 is used to start and stop using the device-linked service. For each of services registered in the license information storage 234 (i.e., services that have already begun to be used), "Stop Using" is displayed as the label of the configuration button 512 (which is hereafter referred to as the stop using button 512). On the other hand, for each of services not registered in the license information storage 234 (i.e., services that have not begun to be used), "Start Using" is displayed as the label of the configuration button 512 (which is hereafter referred to as the start using button 512).

The linked-device selection button 513 is used to display a screen (which is hereafter referred to as a "linked-device selection screen") for selecting an image forming device 10 to be linked with the device-linked service. The linked-device selection button 513 provided for a service that has already begun to be used is selectable.

Assuming that the administrator presses the start using button 512 for a device-linked service with a service name "BBB", the browser 41 displays a dialog for inputting, for example, a license count and a license expiration date. When a license count and an expiration date are input on the dialog, the browser 41 sends, to the portal 221, a use start request including the service name corresponding to the pressed start using button 512, the license count, and the expiration date to request to start using the device-linked service (S109). Then, the portal 221 sends a use start request including the service name, the license count, the expiration date, and the login user name to the service manager 222 (S110). Hereafter, the device-linked service corresponding to the service name in the use start request is referred to as a "use start target service".

When at least one plug-in name is stored in the used plug-in name field of a record of the service information storage 232 corresponding to the service name in the use start request (that is, when it is necessary to install a plug-in(s) in the image forming device 10 to use the device-linked service), the service manager 222 requests the portal 221 to confirm whether to allow addition (or installation) of the plug-in (S111).

Then, the portal 221 sends a request to display a plug-in addition confirmation screen to the browser 41 (S112-1). In response, the browser 41 displays the plug-in addition confirmation screen on the display unit of the administrator terminal 40.

Figure 9:
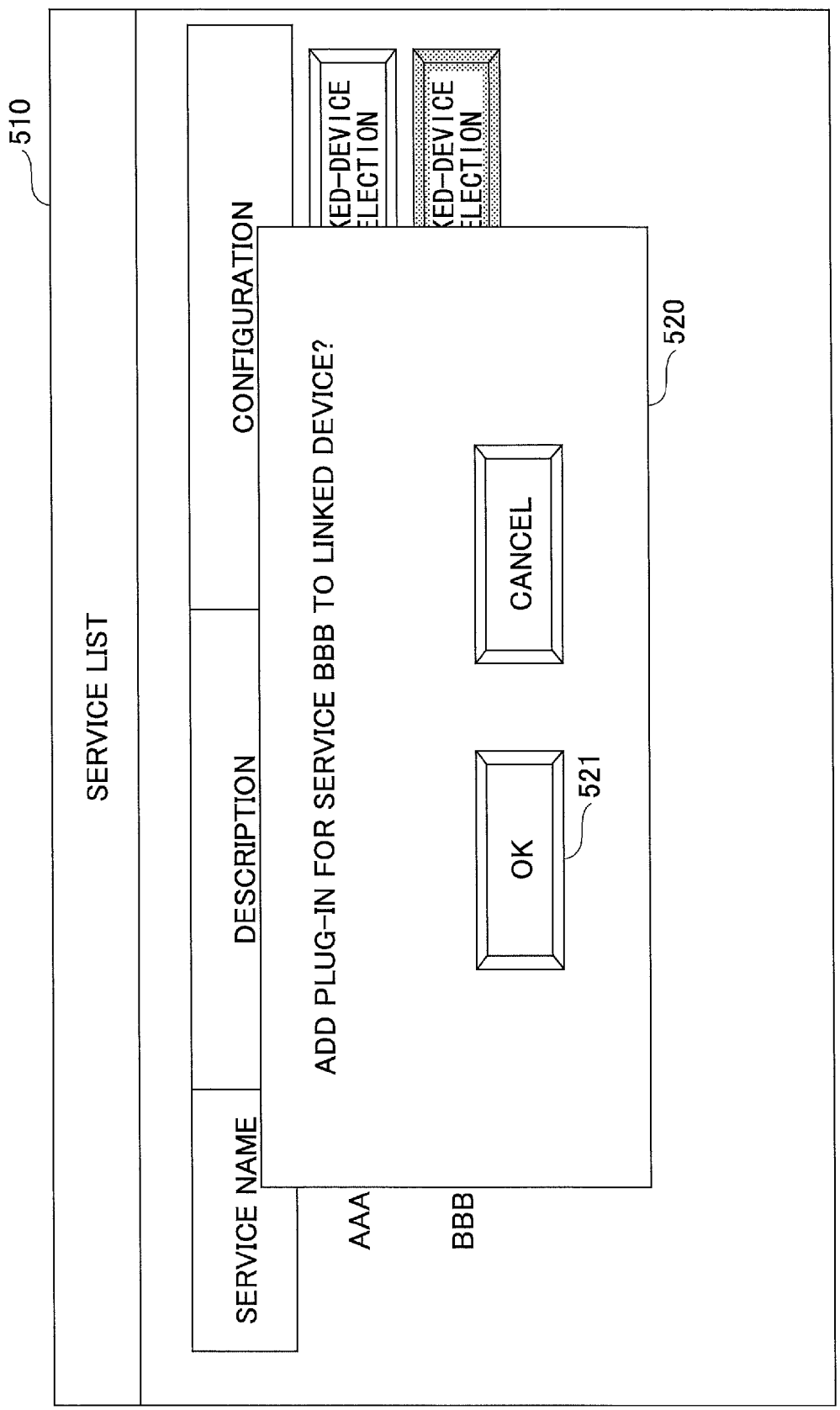
FIG. 9 is a drawing illustrating an exemplary plug-in addition confirmation screen.

FIG. 9 is a drawing illustrating an exemplary plug-in addition confirmation screen 520. As illustrated by FIG. 9, the plug-in addition confirmation screen 520 is displayed as a dialog box superposed on the service list screen 510. The plug-in addition confirmation screen 520 includes a message indicating that it is necessary to add (or install) a plug-in(s) to the image forming device 10 to be linked with the use start target service "BBB".

When the administrator presses an OK button 521 to allow the addition of the plug-in to the image forming device 10, the browser 41 sends, to the portal 221, information indicating that the addition of the plug-in has been allowed (S112-2). The portal 221 transfers the information and the login user name to the service manager 222 (S113). Next, the service manager 222 sends, to the license manager 224, a use start report including the service name of the use start target service, the license count, the expiration date, and the login user name that have been received at step S110 (S114).

The license manager 224 adds, to the license information storage 234, a new record (or license information) including the service name of the use start target service, the license count, the expiration date, and the login user name included in the use start report. The login user name is stored in the owner filed of the record. Also, the usage count of the record is set at 0.

Next, the license manager 224 sends, to the service manager 222, a response indicating that the license information has been normally registered (S115). The service manager 222 sends the response to the portal 221 (S116). Based on the response, the portal 221 generates HTML data for displaying the service list screen 510 (see FIG. 8) where the linked-device selection button 513 for the use start target service is made selectable, and sends a response including the HTML data to the browser 41 (S117).

Based on the HTML data in the response, the browser 41 displays the service list screen 510 on the display unit of the administrator terminal 40. When the linked-device selection screen button 513 corresponding to the use start target service is pressed by the administrator, the browser 41 sends a request to display a linked-device list screen to the portal 221 (S118).

The portal 221 sends, to the device manager 223, a device list request including the login user name to obtain a list of device information (device list) of image forming devices 10 associated with the login user name (S119).

The device manager 223 obtains a list of device information (device list) that is stored in the device information storage 233 in association with the login user name, and sends a response including the obtained device list to the portal 221 (S120).

FIG. 10 is a table illustrating an exemplary data structure of the device information storage 233. As illustrated by FIG. 10, the device information storage 233 stores a record including a device number (field), an owner (field), and an installation location (field) for each image forming device 10.

The device number is identification information (or identifier) for uniquely identifying the image forming device 10. For example, a production number or a serial number may be used as the device number. Also, a MAC address may be used as the device number. The owner is the user name of the administrator of the image forming device 10. The installation location is a character string indicating a location where the image forming device 10 is installed.

Thus, at step S120, a list of records whose owner field includes a user name corresponding to the login user name is sent to the portal 221.

Based on the device list included in the response, the portal 221 generates HTML data for displaying a linked-device selection screen. Then, the portal 221 sends a response including the HTML data to the browser 41 (S121).

Based on the HTML data in the response, the browser 41 displays the linked-device selection screen on the display unit of the administrator terminal 40.

FIG. 11 is a drawing illustrating an exemplary linked-device selection screen 530. As illustrated by FIG. 11, the linked-device selection screen 530 displays, for each image forming device 10 being managed by the administrator, a check button, a device number, and an installation location. When the administrator selects one or more check buttons corresponding to the image forming devices 10 to be linked with the use start target service and presses an OK button 531, the browser 41 sends a list of device numbers corresponding to the selected check buttons to the portal 221 (S122).

Next, the portal 221 sends a link configuration request including the list of device numbers and the service name of the use start target service to the service manager 222 and thereby requests the service manager 222 to perform a link configuration process for linking the image forming devices 10 corresponding to the device numbers with the use start target service (S123). The service manager 222 sends an installation request including the list of device numbers and the service name of the use start target service to the device manager 223, and thereby requests the device manager 223 to install a plug-in(s) for the use start target service in the image forming devices 10 corresponding to the device numbers (S124).

The device manager 223 adds, to the installation status storage 236, a record associated with the service name of the use start target service for each of the device numbers.

FIG. 12 is a table illustrating an exemplary data structure of the installation status storage 236. As illustrated by FIG. 12, the installation status storage 236 stores records each of which includes a service name (field), a device number (field), and a status (field).

The service name is a name of the use start target service. The device number is identification information (or identifier) of the image forming device 10 to which a plug-in for the use start target service is to be installed. The status indicates whether the plug-in has been installed in the image forming device 10. The initial value of the status field is "Not Installed".

Here, the service name is associated with a plug-in name (used plug-in name) in the service information storage 232. Therefore, practically, the information stored in the installation status storage 236 is an example of configuration information (or relationship information) that associates the plug-in name of a plug-in to be installed with an image forming device 10 into which the plug-in is to be installed.

At this timing, the device manager 223 does not send, to the image forming device 10, an installation request for requesting installation of a plug-in for the use start target service. This is because a firewall is normally provided for the user environment E1 and the service intermediation apparatus 20 cannot send a request to the image forming device 10. As an exception, when there is no firewall between the service intermediation apparatus 20 and the image forming device 10 (e.g., when the service intermediation apparatus 20 is provided in the user environment E1), the device manager 223 may send an installation request to the image forming device 10 at this timing.

At the next step, the device manager 223 sends a normal response to the installation request to the service manager 222 (S125). Then, the service manager 222 sends, to the portal 221, a response indicating that the link configuration process has been successfully performed (S126). The portal 221 generates HTML data for displaying a message indicating that the link configuration process has been successfully performed, and sends a response including the HTML data to the browser 41 (S127). Based on the HTML data in the response, the browser 41 displays the message on the display unit of the administrator terminal 40. The administrator reads the message and recognizes that the link configuration process for linking the use start target service and the image forming device 10.

Step S201 and subsequent steps are performed asynchronously with steps S101 through S127.

At step S201, the communication unit 121 of the image forming device 10 sends a query including the device number of the image forming device 10 to the device manager 223 of the service intermediation apparatus 20. Here, it is assumed that an IP address and a port number or a uniform resource locator (URL) for accessing the service intermediation apparatus 20 and the device manager 223 are preset in the image forming device 10.

The query of step S201 may be performed at regular intervals or at a specific timing. The specific timing is, for example, a time when the start-up of the image forming device 10 is completed.

The device manager 223 searches the installation status storage 236 to find a record(s) that corresponds to the device number included in the query and includes "Not Installed" in the status field, and obtains a service name in the found record. When a service name (which is hereafter referred to as a "target service name") is found, the device manager 223 sends a response including an installation request to the image forming device 10 (S202). The installation request includes installation information including the target service name and the IP address and the port number of the service manager 222 of the service intermediation apparatus 20.

When receiving the response including the installation request, the communication unit 121 sends an installation request including the target service name in the installation information to the installation unit 122 and thereby requests the installation unit 122 to perform an installation process (S203). The installation unit 122 sends, via the communication unit 121 to the service manager 222, a license use request including the device number (target device number) of the image forming device and the target service name to request use of a license of a device-linked service corresponding to the service name (S204, S205).

Next, the service manager 222 sends a verification request including the target device number included in the license use request, to request the device manager 223 to determine whether the target device number is valid (S206). For example, the device manager 223 determines that the target device number is valid when the target device number is stored in the device information storage 233. Also, the device manager 223 may determine that the target device number is valid when the target device number is also stored in the installation status storage 236 in association with the target service name. In this case, the verification request includes the target service name in addition to the target device number. The device manager 223 sends a verification result to the license manager 224 (S207).

When the target device number is not valid, subsequent steps are cancelled. When the target device number is valid, the service manager 222 sends a license use report including the target device number and the target service name to the license manager 224 (S208). The license manager 224 searches the license information storage 234 to find a record that corresponds to the target service name, and allows the use of the license when predetermined conditions are satisfied. For example, the license manager 224 allows the use of the license when the usage count is less than the license count in the found record, the owner associated with the target device number matches the owner in the found record, and the current date is on or before the expiration date. When it is determined to allow the use of the license, the license manager 224 increments the usage count stored in the license information storage 234 in association with the target service name by one, and sends a response indicating that the use of the license has been allowed to the service manager 222 (S209). On the other hand, when at least one of the above conditions is not satisfied, the license manager 224 sends, to the service manager 222, a response indicating that the use of the license has not been allowed (S209).

The service manager 222 sends the response from the license manager 224 to the communication unit 121 of the image forming device 10 (S210). The communication unit 121 transfers the response to the installation unit 122 (S211). When the response indicates that the use of the license has not been allowed, subsequent steps are cancelled. On the other hand, when the response indicates that the use of the license has been allowed, the installation unit 122 sends a download request including the target device number and the target service name via the communication unit 121 to the service manager 222 (S212, S213). At steps S214 and S215, similarly to steps S206 and S207, the validity of the target device number is determined.

When the target device number is valid, the service manager 222 searches the service information storage 232 to find a record including the target service name, obtains a plug-in corresponding to a plug-in name stored in the used plug-in name field of the found record from the plug-in storage 235, and sends the obtained plug-in to the communication unit 121 (S216). Here, when the used plug-in field includes multiple plug-in names, the service manager 222 sends multiple plug-ins to the communication unit 121.

The communication unit 121 transfers the plug-in received from the service manager 222 to the installation unit 122 (S217). The installation unit 122 installs the plug-in in the image forming device 10 (S218). When the installation is completed, the installation unit 122 sends, via the communication unit 121 to the service manager 222, a completion report including the target device number and the target service name and indicating the completion of the installation (S219, S220). The service manager 222 sends a completion report including the target device number and the target service name to the device manager 223 (S221). The device manager 223 searches the installation status storage 236 to find a record including the target service name and the target device number, and updates the value of the status field of the found record to "Installed". Thereafter, an installation request (at step S202) is not sent to the same image forming device 10 for the use of the same device-linked service.

Next, the device manager 223 sends a response to the service manager 222 (S222). The service manager 222 sends a response to the communication unit 121 (S223). The communication unit 121 transfers the response to the installation unit 122 (S224). Then, the installation unit 122 starts the installed plug-in (S225). The plug-in starts sending information related to or generated by the image forming device 10 to an application program of the service providing apparatus 30 that provides the use start target service.

Through the above process, a plug-in corresponding to the use start target service is installed.

As described above, according to the present embodiment, when a user selects a device-linked service to be used, a plug-in(s) necessary for linkage with the selected device-linked service is automatically installed into the image forming device 10. Thus, the present embodiment eliminates the need for the user to manually install plug-ins. In other words, the present embodiment makes it possible to simplify a preparation process for linking a device with a service provided via a network.

The present embodiment may also be applied to devices and systems other than the image forming device such as a projector, a smartphone, a cell phone, a digital camera, and a conference system.

The service intermediation apparatus 20 and the service providing apparatus 30 may be integrated into one computer. Also, each of the service intermediation apparatus 20 and the service providing apparatus 30 may be implemented by multiple computers.

Figure 13:
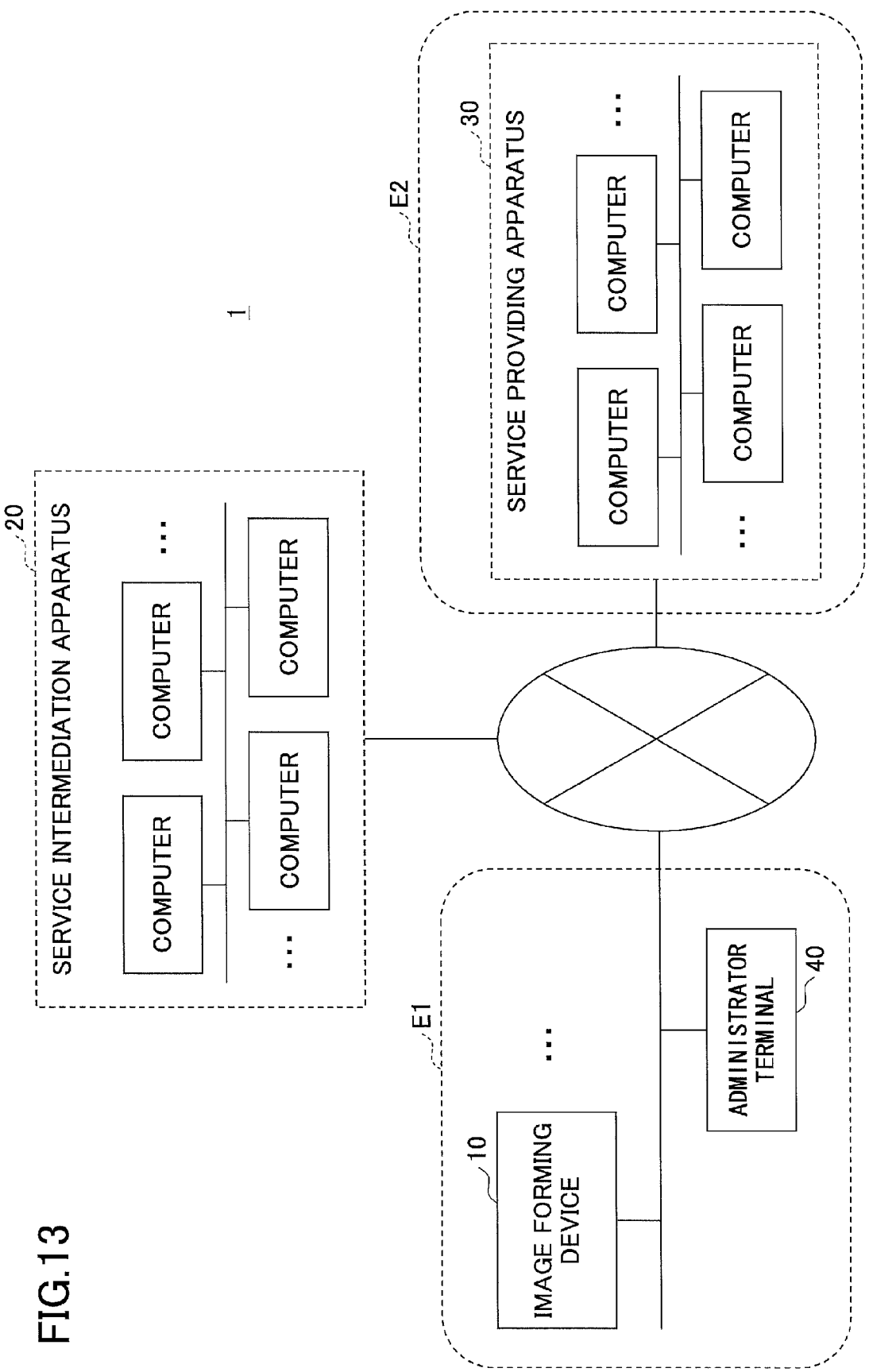
FIG. 13 is a drawing illustrating another exemplary configuration of an information processing system.

FIG. 13 is a drawing illustrating another exemplary configuration of the information processing system 1 where each of the service intermediation apparatus 20 and the service providing apparatus 30 is implemented by multiple computers. In FIG. 13, each of the service intermediation apparatus 20 and the service providing apparatus 30 is implemented by four or more computers. However, the number of computers used to implement each of the service intermediation apparatus 20 and the service providing apparatus 30 may be less than four.

In the above embodiment, the device manager 223 is an example of a configuration unit, the license manager 224 is an example of a transmitting unit, the installation status storage 236 is an example of a relationship information storage, and the license manager 224 is an example of a determining unit.

The above embodiment may also be implemented by a computer-readable storage medium such as a CD-ROM, a DVD, or a USB memory storing a program for causing a computer to perform a process as described with reference to FIGS. 5A and 5B.

An information processing system, an information processing apparatus, a device, and an information processing method of preferred embodiments are described above. However, the present invention is not limited to the specifically disclosed embodiments, and variations and modifications may be made without departing from the scope of the present invention.

What is claimed is:

1. A method performed by a computer connected via a network to one or more devices and a terminal, the method comprising:
   allowing the terminal to select a service to be used;
   identifying a program necessary to use the selected service;
   querying the terminal whether to allow installation of the identified program in a device that uses the selected service and is to be selected from the devices;
   requesting the terminal to select the device that uses the selected service from the devices;
   when receiving a service identifier of the selected service and a device identifier of the selected device, storing configuration information in a relationship information storage, wherein the configuration information associates the received service identifier, the received device identifier, and a program identifier of the program with each other, and the program identifier is stored in a service information storage in association with the service identifier; and
   sending an installation request to install the program to the device corresponding to the device identifier that is associated by the configuration information with the program identifier,
   wherein the one or more devices, the terminal, and the computer are distinct from each other; and
   wherein the received service identifier, the received device identifier, and the program identifier are distinct from each other.

2. The method as claimed in claim 1, wherein the installation request is sent to the device in response to a query from the device, to request the device to install the program corresponding to the program identifier associated with the device identifier.

3. The method as claimed in claim 1, further comprising:
   when receiving a request to use a license for the service from the device receiving the installation request, determining whether to allow use of the license based on license information indicating a status of the license for the service; and
   when it is determined to not allow the use of the license, causing the device to cancel installation of the program.

4. A system where one or more devices, a terminal, and at least one information processing apparatus are connected via a network to each other, the system comprising:
   a processor programmed to implement
      a management unit that
         allows the terminal to select a service to be used,
         identifies a program necessary to use the selected service,
         queries the terminal whether to allow installation of the identified program in a device that uses the selected service and is to be selected from the devices, and requests the terminal to select the device that uses the selected service from the devices;

a configuration unit that, when receiving a service identifier of the selected service and a device identifier of the selected device from the management unit, stores configuration information in a relationship information storage, wherein the configuration information associates the received service identifier, the received device identifier, and a program identifier of the program with each other, and the program identifier is stored in a service information storage in association with the service identifier; and a transmitting unit that sends an installation request to install the program to the device corresponding to the device identifier that is associated by the configuration information with the program identifier, wherein the one or more devices, the terminal, and the information processing apparatus are distinct from each other; and wherein the received service identifier, the received device identifier, and the program identifier are distinct from each other.

5. The system as claimed in claim 4, wherein the transmitting unit sends the installation request to the device in response to a query from the device and thereby requests the device to install the program corresponding to the program identifier associated with the device identifier.

6. The system as claimed in claim 4, further comprising:
a license information storage that stores license information indicating a status of a license for the service,
wherein the processor is programmed to further implement a determining unit that, when receiving a request to use the license from the device receiving the installation request, determines whether to allow use of the license based on the license information; and
wherein when the determining unit determines to not allow the use of the license, the transmitting unit causes the device to cancel installation of the program.

7. A device connected via a network to a terminal and an information processing apparatus that includes a processor programmed to implement
a management unit that
allows the terminal to select a service to be used,
identifies a program necessary to use the selected service,
queries the terminal whether to allow installation of the identified program in a device that uses the selected service and is to be selected from one or more devices, and
requests the terminal to select the device that uses the selected service from the devices, a configuration unit that, when receiving a service identifier of the selected service and a device identifier of the selected device from the management unit, stores configuration information in a relationship information storage, wherein the configuration information associates the received service identifier, the received device identifier, and a program identifier of the program with each other, the program identifier being stored in a service information storage in association with the service identifier, and a transmitting unit that sends an installation request to install the program to the device corresponding to the device identifier that is associated by the configuration information with the program identifier, the device comprising:
a processor programmed to implement
a communication unit that receives the installation request from the information processing apparatus; and
an installation unit that installs the program in response to the installation request,
wherein the one or more devices, the terminal, and the information processing apparatus are distinct from each other; and
wherein the received service identifier, the received device identifier, and the program identifier are distinct from each other.

8. The device as claimed in claim 7, wherein
the communication unit sends a query to the information processing apparatus; and
the transmitting unit of the information processing apparatus sends the installation request to the device in response to the query and thereby requests the device to install the program corresponding to the program identifier associated with the device identifier.

9. The device as claimed in claim 7, wherein
when receiving the installation request, the communication unit sends a request to use a license for the service to the information processing apparatus;
the information processing apparatus further includes a license information storage that stores license information indicating a status of the license for the service;
the processor of the information processing apparatus is programmed to further implement a determining unit that, when receiving the request to use the license, determines whether to allow use of the license based on the license information; and
when the determining unit determines to not allow the use of the license, the transmitting unit causes the device to cancel installation of the program.

* * * * *